United States Patent [19]
Browning et al.
[11] 3,798,365
[45] Mar. 19, 1974

[54] RECORDING METHOD AND APPARATUS UTILIZING LIGHT ENERGY TO MOVE RECORD FORMING MATERIAL ONTO A RECORD MEDIUM

[76] Inventors: Iben Browning, 1052 Pomeroy Ave., Santa Clara, Calif. 95051; Peter R. Johnson, 41 Beverly Ter., Mill Valley, Calif. 94941

[22] Filed: July 14, 1969

[21] Appl. No.: 841,435

[52] U.S. Cl. ............... 178/6.6 A, 178/6.6 R, 346/1, 346/76 L, 346/140
[51] Int. Cl. ............... G03g 15/04
[58] Field of Search ........ 346/108, 76 R, 76 L, 140, 346/1; 178/6.6 A, 6.6 R, 6.6 B; 95/18 P

[56] References Cited

UNITED STATES PATENTS

| | | | |
|---|---|---|---|
| 3,573,847 | 4/1971 | Sacerdoti | 346/76 |
| 3,563,647 | 2/1971 | Kittredge | 355/043 |
| 2,487,865 | 11/1949 | Glassey | 346/76 L |
| 2,556,550 | 6/1951 | Murray | 346/76 L |
| 3,291,555 | 12/1966 | Browning | 95/18 P |
| 3,316,348 | 4/1967 | Hufnagel et al. | 178/6.6 |
| 3,351,948 | 11/1967 | Bonn | 346/76 L |
| 3,461,229 | 8/1969 | Oppenheimer | 178/6.6 |
| 3,465,352 | 9/1969 | Carlson et al. | 346/76 L |

OTHER PUBLICATIONS

Woodward, Distillation Printing, 4/67, IBM Technical Disclosure Bulletin, Vol. 9 No. 11, p. 1592.

*Primary Examiner*—Vincent P. Canney
*Assistant Examiner*—Stuart Hecker
*Attorney, Agent, or Firm*—Limbach, Limbach & Sutton

[57] ABSTRACT

A recording method and apparatus useful for a photocopy device are disclosed utilizing light energy to move a record forming material onto a record medium. Light energy, particularly from a laser, is focused to minute size and scanned across a member supporting a record forming material. The intensity of the light beam is modulated with information between a level at which said record forming material remains on the support member and a level at which the record forming material is caused to move from the support member to a record medium. A lens mosaic can be used to concentrate the light beam at minute cavities on the support member for containing the record forming material, and this support member can take the form of a screen or a member integral with the lens mosaic having cavities therein. The lens mosaic can be in the form of a semi-cylindrical surface, and a plurality of record forming material support members can be used, each member supporting a material of a different color for producing a color copy.

2 Claims, 9 Drawing Figures

INVENTORS
IBEN BROWNING
PETER R. JOHNSON
BY Limbach and Limbach
ATTORNEYS

INVENTORS
IBEN BROWNING
PETER R. JOHNSON
BY Limbach and Limbach
ATTORNEYS

RECORDING METHOD AND APPARATUS UTILIZING LIGHT ENERGY TO MOVE RECORD FORMING MATERIAL ONTO A RECORD MEDIUM

The present invention relates in general to a method and apparatus for recording or printing information and more particularly to a photocopy method and device for producing black and white or full color copies of documents, pictures, prints, and the like.

A number of different types of copy machines have been developed in recent years including photocopy machines using electrostatic, thermal, and wet process recording techniques. Each of these machines has its advantages and disadvantages. Additionally, new techniques and devices for electronic type-setting using cathod ray tubes (CRT's) in conjunction with data storage devices are presently being developed for photo type-setting systems. A simple, relatively inexpensive technique and device are needed for copying and printing information.

The object of the present invention is to provide a new, simple, copying and printing device and method which are capable of producing both black and white and full color reproductions.

Broadly stated, the present invention, to be described in greater detail below, is directed to method and apparatus for recording information on a record medium wherein a record forming material is supported on a support member adjacent the record medium, a light beam is caused to scan across the support member and the intensity of the light beam at the support member is modulated between a level at which the record forming material remains on the support member and a level at which the record forming material is caused to move to the record medium. With this invention information can be formed on a record medium such as printing on a page quickly and easily and without the necessity for forming an intermediate information bearing body.

The term "record forming material" is utilized herein and in the appended claims to mean any material that will establish information on another medium, and the term "record medium" is utilized herein and in the appended claims to mean any material on which information can be established by the record forming material.

In accordance with another aspect of the present invention a lens mosaic is provided for focusing the light beam from a laser light source onto the record medium support member for concentrating the light beam at cavities of the support member containing the record forming material. This construction permits utilization of a relatively low power laser and easy uniform distribution and support of the record forming material. The term "cavity" is used herein to mean a hole or opening for containing a material and can either be open at only one end, such as in one surface of a body, or open at two positions, such as the mesh of a screen.

In accordance with another aspect of the present invention the support member for the record forming material is in the form of a screen member with the individual openings of the mesh located on the optical axes of the lens portions making up the lens mosaic when a lens mosaic is used to concentrate the light beam energy at the support member for the record forming material, and means is provided for depositing the record forming material in the screen mesh. This construction provides an inexpensive assembly and one to which information forming material can be easily applied and from which material is easily dispelled.

In accordance with still another aspect of the present invention the support member for the record forming material is integral with the lens mosaic and a surface of said support member includes hollowed-out cavities therein, each cavity located on the optical axis of one of the lens portions of the lens mosaic. With this construction good registration between the lens portions of the lens mosaic and the cavities is accomplished, and these elements can be moved together relative to the beam to create a beam sweeping relationship. Additionally, the cavities can be formed by a higher power laser focused through the system to ablate portions of the support member.

In accordance with still another aspect of the present invention means is provided for sweeping the light beam back and forth along a path parallel to the longitudinal axis of the record forming material support member. This support member is formed in a semi-cylindrical configuration and is movable with the record medium with respect to such path effectively to scan the light beam across the record medium.

These and other features and advantages will become more apparent upon a perusal of the following specification taken in conjunction with the accompanying drawings wherein similar characters of reference refer to similar structures in each of the several views.

While it will be appreciated from the description that follows that the present invention provides a unique method and apparatus useful for copying or printing a variety of different forms of information, it is especially applicable to a commercial office type photocopy machine which can provide black and white or color copies of sheet information. Therefore, for purposes of illustration the invention will be described in detail with respect to such a copying machine schematically illustrated in the accompanying drawings.

Figure 1:
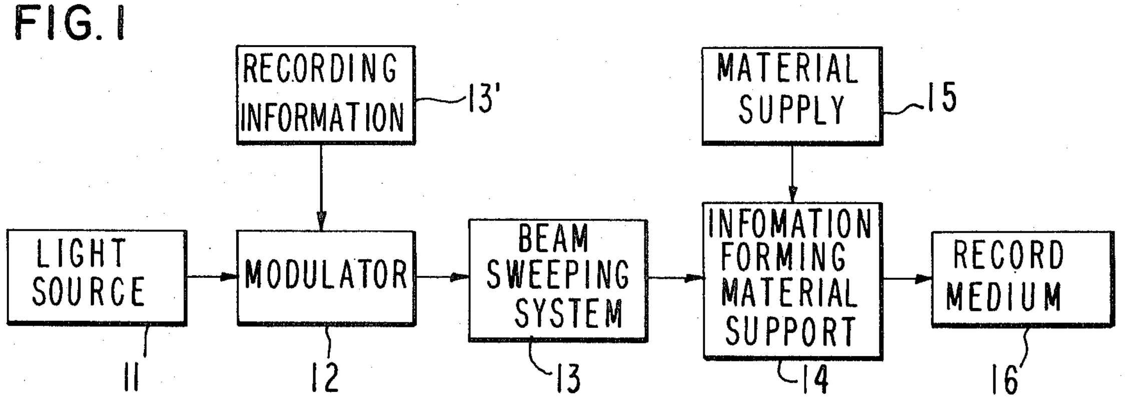
FIG. 1 is a schematic block diagram view showing the elements and steps of the copying method and apparatus in accordance with the present invention.

Referring now to FIG. 1 there is shown a schematic block diagram view of a photocopy method and apparatus in accordance with the present invention. As illustrated, the method and apparatus includes provision for forming a narrow light beam 11, typically a CW laser, which is modulated, such as by a Kerr cell 12, with information 13 to be recorded such as information obtained from scanning a sheet of paper to be reproduced. The modulated light beam from modulator 12 is scanned or swept by means of a beam sweeping system 13 across an information forming material support member 14.

The beam sweeping system 13 can be any of a variety of the state of the art sweeping mechanisms or the type illustrated below. Typically, the sweeping system 13 utilizes an optical system of lenses and mirrors for providing relative movement between the light beam and the material support member 14. The scanning or sweeping which is referred to herein and in the appended claims includes provision for moving either the beam or the material support member 14 or both relative to each other.

The material support member 14 is in the form of a matrix for holding information forming material from a material supply source 15 in discreet locations or cavities for projection onto a recording medium 16.

The information forming material can be one of a variety of different materials selected to cooperate with the recording medium 16 such that upon projection of the information forming material onto the recording medium 16 information is temporarily or permanently recorded on medium 16. For example, material 15 can consist of an ink or dye for deposit on a paper or fabric medium, a chemical resist for deposit on a suitable sheet, plate or film to be subsequently, chemically treated, a wax to be deposited on a record medium subsequently treated with a material non-adherent to wax, a material such as a dry adhesive made adherent by the light beam to the record medium such as a plastic film, a metal for deposit on a metal or ceramic substrate, or the like.

The intensity of the light beam is modulated between a level at which the record forming material remains on the support member 14 or is non-adherent to the record medium, and a level at which the record forming material is caused to move to or be adherent to the record medium 16. Typically, the difference in intensity is such as to heat up the information forming material and scatter or project the material onto the record medium 16 for adherence, drying or reaction thereon.

Figures 2, 3:
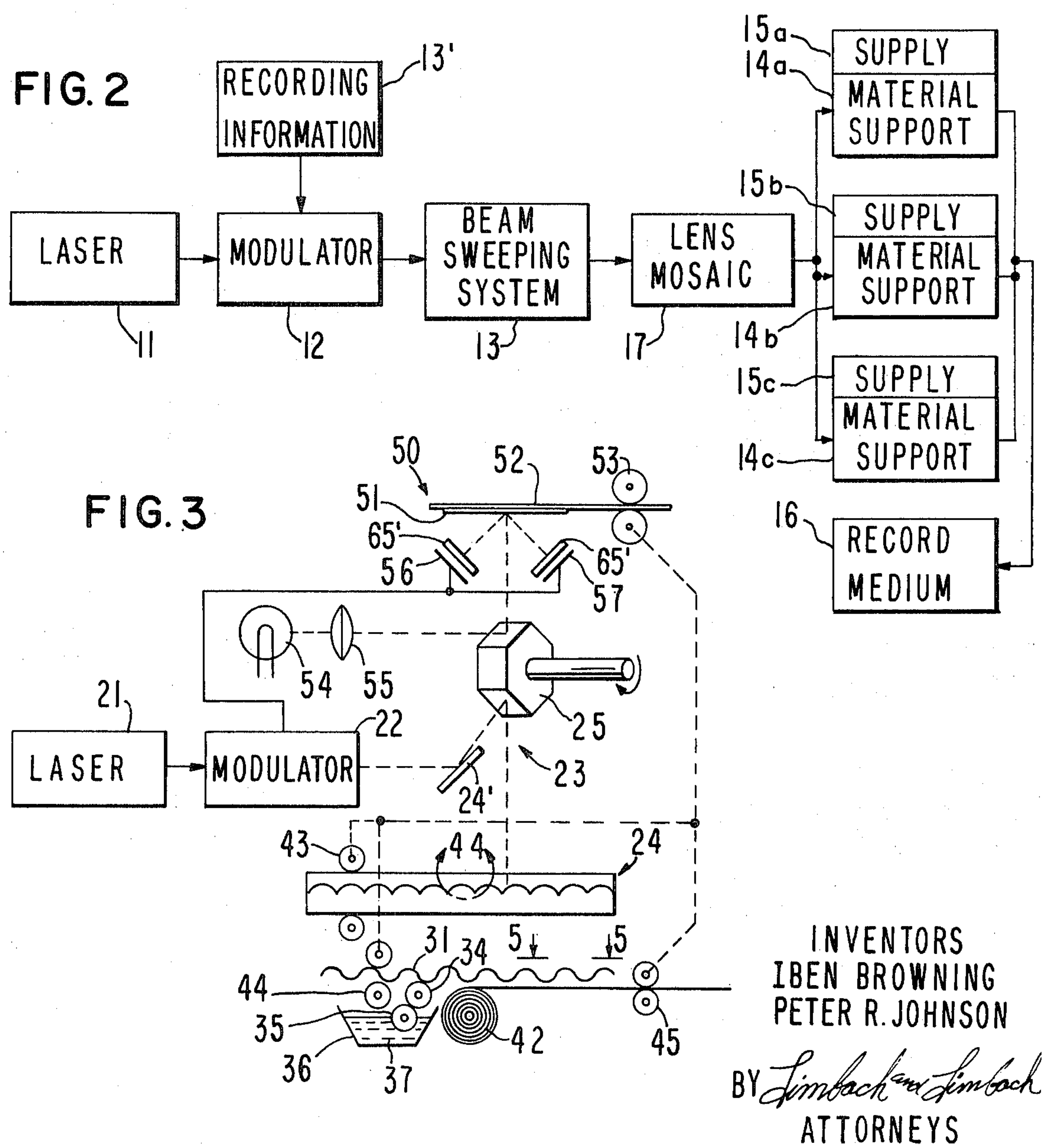
FIG. 2 is a view similar to FIG. 1 modified to show an alternative embodiment of the present invention.
FIG. 3 is a schematic elevational view of a photocopy machine constructed in accordance with the present invention.

FIG. 2 shows an alternative embodiment of the present invention wherein the modulated light beam from the light source 11 and modulator 12 is swept by the beam sweeping system 13 across a lens mosaic 17 including a multiplicity of lens portions, each for focusing the light beam onto a minute portion of the information forming material support member 14 which takes the form of a plurality of support members 14*a*, 14*b* and 14*c*, each of which supports a different material from material sources 15*a*, 15*b* and 15*c*, respectively. In accordance with this embodiment of the present invention the lens mosaic serves to concentrate the otherwise ineffective modulated light beam to minute dimensions for projection of material onto the record medium 16, and a color copy can be produced by successively scanning the light beam across the different material support members each including a different colored material, such as a different colored ink. On successive scans of the modulated light beam different recording information is provided from the storage 13 to the modulator 12, such as an image of a sheet to be copied taken through different light filters.

The lens mosaic can be a matrix, such as of plastic, including a multiplicity of lens portions for focusing the light beam to discrete quantities of information forming material. The mosaic can be rigid or flexible and can also include a multiplicity of optical fibers. A flexible mosaic 14 with optical fibers can be deformed to conform to irregular shapes of record media 16 and concentrate light from the light source on the information forming material for such media.

Referring now to FIG. 3 there is shown a schematic elevational view of a photocopy machine in accordance with the present invention and wherein a light beam from a laser source 21 is modulated with information in a modulator 22, such as a Kerr cell, and directed by an optical system 23 to a lens mosaic 24. The optical scanning system 23 includes a mirror 24′ for reflecting the beam onto a rotating multifaceted mirror 25, which effectively causes the modulated light beam to scan a path back and forth transversely of the lens mosaic 24.

Figure 4:
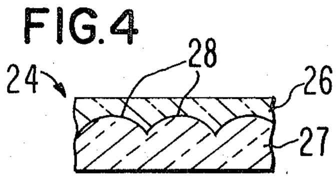
FIG. 4 is an enlarged sectional view of a portion of the structure shown in FIG. 3 and delineated by line 4—4.

As shown in FIG. 4, the lens mosaic can be formed of a sandwich type plastic medium including an upper material 26 overlying a lower material 27 having lens portions 28 formed therein. The size of the lens portions 28 is selected to accommodate the other parameters of the system, such as the diameter of the discrete quantities of information forming material and the resolution desired. By way of example in a photocopying apparatus which provides 100 bits per inch that will produce an acceptable half tone reproduction, each lens portion can have a diameter of 0.01 inch.

Figure 5:
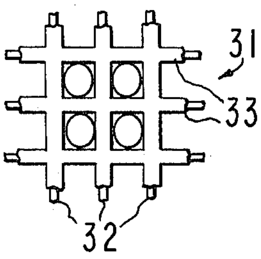
FIG. 5 is an enlarged view of a portion of the structure shown in FIG. 3 taken along line 5—5 in the direction of the arrows.

The thickness of lens mosaic 24 is selected such that the modulated light beam passing through the mosaic 24 is focused at the surface of an information forming material support member 31 positioned therebelow. In the embodiment illustrated in FIGS. 3 and 5 the support member 31 takes the form of a screen member, such as a standard half-tone metal screen, coated with a non-wetting material such as Teflon, which will support a droplet of information forming material, such as ink, in the mesh on the optical axis, and typically at the focus of each of the lens portions 28. The information forming material is applied to the cavities, openings or intersticies of a screen member 31 from a suitable supply such as an applicator roller 34 in rolling contact with a carrier roller 35 submerged in a supply of the information forming material 36 in the container 37.

The record medium 16, such as a sheet of paper 41 from a supply roll 42 in the case of an ink information forming material, is positioned beneath the screen 31 whereby the ink can be projected thereonto from the screen 31 when the light beam of sufficient intensity is directed onto or focused onto the droplets in the screen 31.

The light beam is effectively scanned across the lens mosaic 24 and the screen 31 to scan the sheet 41 by causing the mosaic 24, the screen 31, and the sheet 41 to drive together across a path swept by the light beam by means of the rotating multifaceted mirror 25. This drive mechanism can take the form of any of a number of drive mechanisms such as ganged, chain driven roller drives 43, 44 and 45 for the mosaic 24, screen 31 and sheet 41, respectively.

The information being recorded by means of modulation of the light beam 21 can be provided to the modulator 22 in a number of different ways. For example, the information can be read from an image screen, from a CRT, or directly from an information storage medium, such as a computer memory.

In the embodiment illustrated, the information for the modulator 22, is obtained in a scanning assembly 50 by scanning the face of an information bearing sheet 51, such as a printed page. The scanning assembly 50 illustrated includes a sheet support 52 driven by a drive assembly 53 ganged with the drive means 43, 44 and 45. A light system, including a light source 54 and lens system 55, reflects light off another portion of rotating mirror 25 from the laser beam reflecting surface for illumination of the information bearing face of sheet 51. Information is read from the sheet by photodetectors 56 and 57, which detect light reflected from the sheet 51, and the output signals of detectors 56 and 57 are fed to the control of the modulator 22.

It will be apparent that as the sheet 51 to be copied is moved relative to the sweeping light beam from light source 54 the printing sheet 41 is moved relative to the sweeping light beam from laser 41. Thus, the intensity of the laser is modulated in accordance with the information on the face of sheet 51 and ink is accordingly projected or blasted from the screen 31 onto sheet 41.

Figure 6:
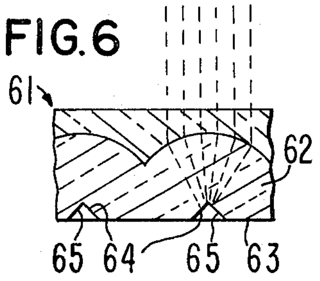
FIG. 6 is an elevational sectional view of an alternative construction for a portion of the structure illustrated in FIG. 3.

FIG. 6 illustrates an alternative embodiment of this invention wherein the information forming material support member is formed integral with the lens mosaic and wherein the integral assembly 61 includes the lens mosaic 62, the back surface 63 of which is provided with cavities 64 on the optical axis, preferably at the focal points, of the lens portions of the mosaic. With this construction the information forming material, such as ink 65, can be wiped across the back surface 63 and retained in the cavities 64 and subsequently blasted therefrom by the high intensity light beam swept thereacross.

The cavities 64 can be conveniently produced by operation of the scanning assembly with a laser more powerful than utilized for conventional operations, such that the cavities are produced by laser ablation.

With the present invention a photocopy machine can be provided utilizing a hundred line per inch cavity structure, be it a half-tone screen or pits in the back surface, whereby a dot can be formed by a droplet in each cavity. Considering each dot as a digital bit, an 8 ½ by 11 sheet of paper includes about a million bits of information for reproduction of either type or pictures.

The invention has been described thus far with respect to FIGS. 3–6 for application of the information forming material of a single type. As described, with reference to FIG. 2, other types of copy, such as color copies, can be produced. For the apparatus of FIG. 3 different color inks can be successively applied to the screen 31 for repeated projection onto the sheet 41. In this way, the single sheet can be run past the scanning beam on three successive passes during each of which a different color filter 65' is provided in the optical reading assembly 50 for providing the information to the modulator 22. During each pass either a different ink can be provided to the screen 31 or different screens 66, 67 and 68, as shown in FIG. 7, can be swung into place.

Figures 7, 8:
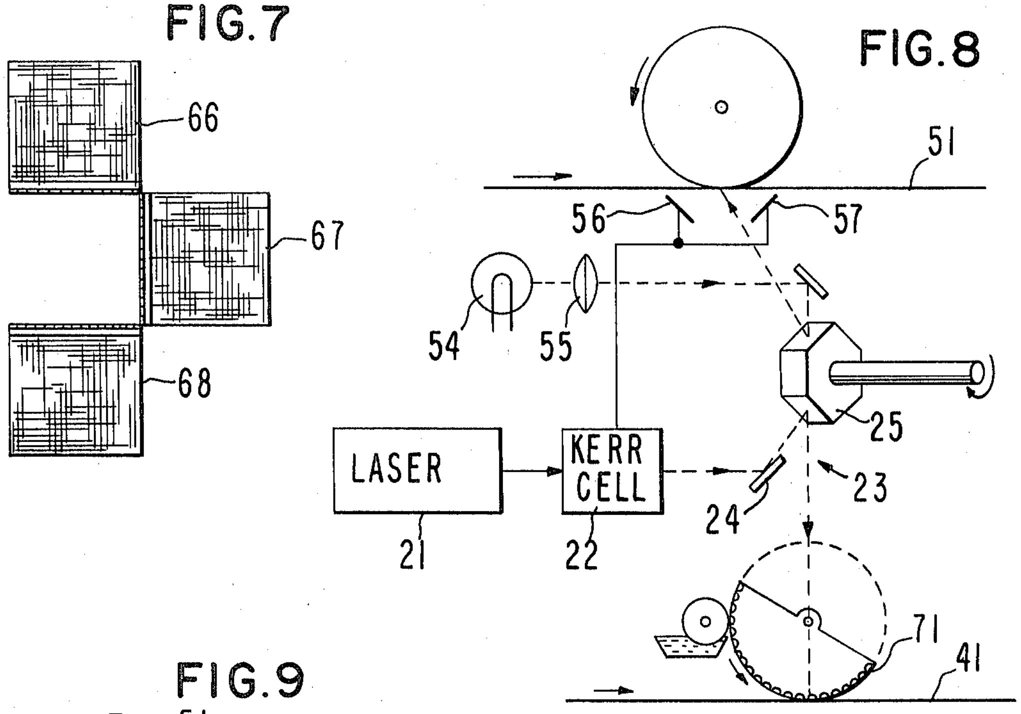
FIG. 7 is a plan view showing an alternative construction of a portion of the apparatus illustrated in FIG. 3.
FIG. 8 is a schematic elevational view illustrating still another embodiment of the present invention.

In accordance with another embodiment of the present invention, illustrated in FIG. 7, the lens mosaic 71 can be semicircular in configuration for rotation about an axis parallel to the sweep of the modulated laser beam and for passage of the laser beam therethrough. The information forming material support member can take the form of a screen movable with the lens mosaic 71 or a pitted surface as that shown in FIG. 6.

In accordance with still another embodiment of the present invention the construction of FIG. 7 can be utilized for a full color type printing machine, as illustrated in FIG. 8.

Figure 9:
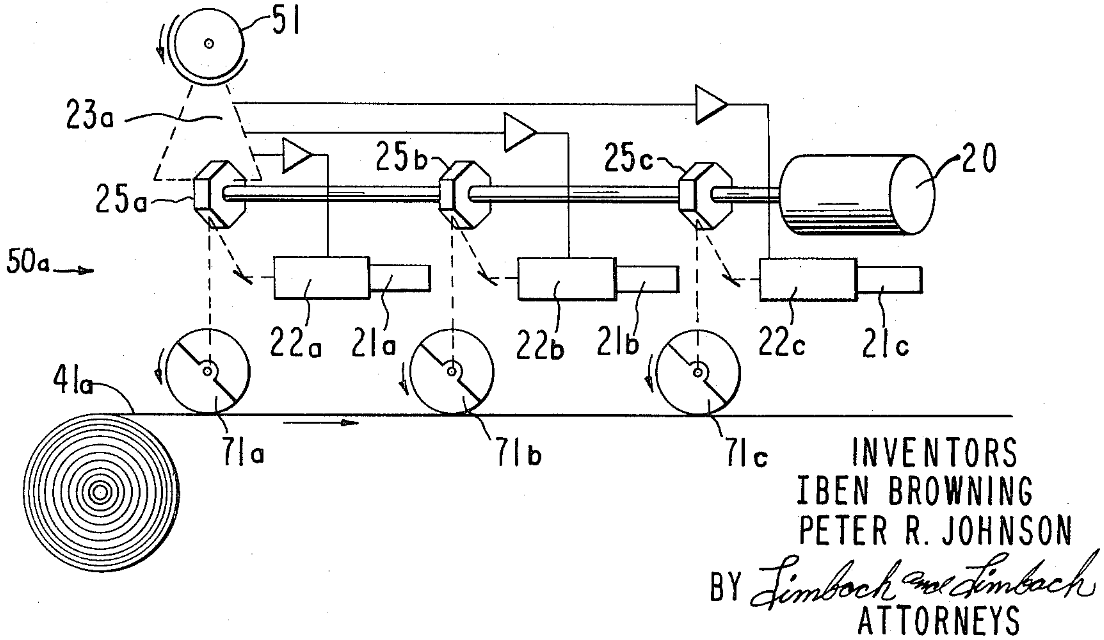
FIG. 9 is a view similar to the FIG. 8 illustrating still another embodiment of the present invention.

As shown in FIG. 9, the material to be scanned includes a scanner assembly **50*a* provided with three color discriminators, and the sweeping assembly includes three lasers 21*a*, 21*b* and 21*c* and associated modulators 22*a*, 22*b* and 22*c*, wherein the modulated light is reflected off multifaceted mirrors 25*a*, 25*b* and 25*c*, rotated by means of a motor 20 for scanning along separate paths parallel to the longitudinal axes of three semi-cylindrical shaped lens mosaics 71*a*, 71*b* and 71*c*, respectively. Successive information signals derived from the scanner assembly 23*a* are passed through control circuits 72*a*, 72*b* and 72*c* for the modulators 22*a*, 22*b* and 22*c*, respectively, successively to modulate the lasers for successively printing a single portion of the record medium 41*a*** with different colored ink.

What is claimed is:

1. Apparatus for recording information on a record medium comprising:

a printing member having a surface including cavities for receiving and containing record forming material, means for depositing a record forming material on said surface of said printing member, means for positioning a record medium adjacent said surface of said printing member, means for generating a light beam, means for directing said light beam to said surface of said printing member including a lens mosaic integral with said printing member and having a multiplicity of lens portions for concentrating said light beam at said surface, said cavities located in said surface of said integral lens mosaic printing member with each of said cavities positioned on the optical axis of one of said lens portions and located at the focus of said one of said lens portions of said lens mosaic, means for scanning said light beam across said lens mosaic to direct said light beam successively through said lens portions, and means for modulating the intensity of said light beam at said surface between a level at which said record forming material remains in the cavities on said surface and a level at which said record forming material is caused to move to the record medium.

2. Apparatus for recording information from an information bearing sheet onto a record material comprising:

means for supporting an information forming material for projection onto a record material and including a surface having cavities therein for containing said information forming material, a lens mosaic integral with said material supporting means and including a multiplicity of lens portions each having its optical axis passing through one of said cavities and each for concentrating a light beam at a cavity portion of said material supporting means, means for positioning a recording medium adjacent said material supporting means, means for generating a coherent beam of light, means for causing said beam of light to sweep back and forth across said lens mosaic for successively focusing said light beam through the different lens portions of said lens mosaic to the cavity portions of said material supporting means, means for modulating the intensity of said light beam at said material supporting means in accordance with information on said information bearing sheet between a level at which said information forming material remains on said material supporting means and a level at which said information forming material is caused to move to the record material.

* * * * *